US007738766B2

(12) United States Patent
Silverman et al.

(10) Patent No.: US 7,738,766 B2
(45) Date of Patent: Jun. 15, 2010

(54) SANCTIONED TRANSCODING OF DIGITAL-MEDIA CONTENT (75) Inventors: Andrew L. Silverman, Redmond, WA (US); Dennis A Kiilerich, Kirkland, WA (US); Kipley J. Olson, Mercer Island, WA (US); Madhuvan Gupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1352 days.

(21) Appl. No.: 11/108,301

(22) Filed: Apr. 18, 2005

(65) Prior Publication Data
US 2006/0232448 A1 Oct. 19, 2006

(51) Int. Cl.
H04N 5/76 (2006.01)
H04N 7/00 (2006.01)
H04N 5/00 (2006.01)

(52) U.S. Cl. .......................................... 386/46; 386/125
(58) Field of Classification Search ..................... 386/1, 386/45–46, 125–126
See application file for complete search history.

(56) References Cited

U.S. PATENT DOCUMENTS

| 5,893,920 | A | 4/1999 | Shaheen et al. |
| 5,987,126 | A | 11/1999 | Okuyama et al. |
| 6,052,735 | A | 4/2000 | Ulrich et al. |
| 6,189,146 | B1 | 2/2001 | Misra et al. |
| 6,219,652 | B1 | 4/2001 | Carter et al. |
| 6,324,544 | B1 | 11/2001 | Alam et al. |
| 6,327,652 | B1 | 12/2001 | England et al. |
| 6,393,434 | B1 | 5/2002 | Huang et al. |
| 6,407,680 | B1 | 6/2002 | Lai et al. |
| 6,463,445 | B1 | 10/2002 | Suzuki et al. |
| 6,493,758 | B1 | 12/2002 | McLain |
| 6,542,546 | B1 | 4/2003 | Vetro et al. |
| 6,611,358 | B1 | 8/2003 | Narayanaswamy |
| 6,757,517 | B2 | 6/2004 | Chang |
| 6,772,340 | B1 | 8/2004 | Peinado et al. |
| 6,775,655 | B1 | 8/2004 | Peinado et al. |
| 6,959,348 | B1 | 10/2005 | Chan et al. |
| 6,981,045 | B1 | 12/2005 | Brooks |

(Continued)

FOREIGN PATENT DOCUMENTS

WO  WO02/28006  4/2002

(Continued)

OTHER PUBLICATIONS

Nikkei Electronics, "Contents Transcoding Technology is Now Spotlighted as 'Lubricant' for Online Digital Distribution"; vol. 775, 2000, pp. 57-62.

(Continued)

Primary Examiner—Thai Tran
Assistant Examiner—Nigar Chowdhury
(74) Attorney, Agent, or Firm—Lee & Hayes, PLLC (57) ABSTRACT Described herein are one or more implementations for transferring formatted digital media content ("formatted-media-content") from a source device (e.g., a desktop computer) to a target media-playback device (e.g., a MP3 player). The formatted-media-content may need to be converted from a source format to a target format before it is transferred. An implementation seeks permission from a source-format-agent associated with the source format of the formatted-media-content, to perform a format-conversion ("transcoding").

20 Claims, 4 Drawing Sheets

U.S. PATENT DOCUMENTS

| | | | |
|---|---|---|---|
| 6,983,371 | B1 | 1/2006 | Hurtado, at al. |
| 7,039,643 | B2 | 5/2006 | Sena et al. |
| 7,054,335 | B2 | 5/2006 | Wee et al. |
| 7,054,964 | B2 | 5/2006 | Chan et al. |
| 7,089,309 | B2 | 8/2006 | Ramaley et al. |
| 7,111,058 | B1 | 9/2006 | Nguyen et al. |
| 7,120,873 | B2 | 10/2006 | Li |
| 7,133,925 | B2 | 11/2006 | Mukherjee et al. |
| 7,143,354 | B2 | 11/2006 | Li et al. |
| 7,155,475 | B2 | 12/2006 | Agnoli et al. |
| 7,200,680 | B2 | 4/2007 | Evans et al. |
| 7,203,620 | B2 | 4/2007 | Li |
| 7,278,165 | B2 | 10/2007 | Molaro |
| 7,290,699 | B2 | 11/2007 | Reddy et al. |
| 7,382,879 | B1 * | 6/2008 | Miller .................. 380/201 |
| 7,421,024 | B2 | 9/2008 | Castillo |
| 7,433,546 | B2 | 10/2008 | Marriott et al. |
| 7,474,106 | B2 | 1/2009 | Kanno |
| 7,475,106 | B2 | 1/2009 | Agnoli et al. |
| 2001/0033619 | A1 * | 10/2001 | Hanamura et al. ..... 375/240.26 |
| 2002/0078075 | A1 | 6/2002 | Colson et al. |
| 2003/0028488 | A1 | 2/2003 | Mohammed et al. |
| 2003/0028643 | A1 | 2/2003 | Jabri |
| 2003/0126608 | A1 | 7/2003 | Safadi et al. |
| 2003/0158913 | A1 | 8/2003 | Agnoli et al. |
| 2004/0193648 | A1 | 9/2004 | Lai et al. |
| 2004/0196975 | A1 | 10/2004 | Zhu et al. |
| 2005/0239434 | A1 | 10/2005 | Marlowe |
| 2006/0008256 | A1 | 1/2006 | Khedouri et al. |
| 2007/0058718 | A1 | 3/2007 | Shen et al. |
| 2007/0153910 | A1 | 7/2007 | Levett |

FOREIGN PATENT DOCUMENTS

| | | |
|---|---|---|
| WO | WO03/034313 | 4/2003 |
| WO | WO03/058508 | 7/2003 |
| WO | WO2004/102459 | 11/2004 |

OTHER PUBLICATIONS

"Context -based media Adaptation in Pervasive Computing" Internet May 31, 2001 Retrieved from url:http://www.mcrlab.uottawa.ca/papers/Ryan_paper.pdf retrieved on Aug. 19, 2004.

"Transcode" Online Nov. 29, 2002 retrieved from the internet: url:http.//www.theorie.physik.uni-goettingen.de/{ostreich/transcode/html/intro.html retrieved Aug. 19, 2004.

"SoX—Sound eXchange" Internet Dec. 12, 2003 retrieved from url:http://web.archive.org/web/20031212170807/http://sox,sourceforge.net retrieved Aug. 16, 2004.

"Transcoding: Extending e-buisness to new environments" Internet Nov. 6, 2002 Retrieved from URL:http://researchweb.watson.ibm.com/journal/sj/401/britton.html retrieved Aug. 19, 2004.

Britton, "Transcoding: Extending E-Business to New Environments"; IBM Systems Journal, 2001, vol. 40, No. 1; pp. 153-178.

Chandra, et al., "Application-Level Differentiated Multimedia Web Services Using Quality Aware Transcoding"; IEEE Journal on Selected Areas of Communications, Dec. 2000; vol. 18, No. 12; pp. 2544-2564.

"An Adaptive Web Content Delivery System" Internet May 21, 2000 Retrieved from the Internet URL:http://research.microsoft.com/asia/dload_files/g-mcomputing/MediaCom2/v5.pdf retrieved Aug. 20, 2004.

Chen, et al, "Mobile EE-an Interprise Mobile Service Platform"; Wireless Networks, 2003; vol. 9, No. 4; pp. 283-297.

pervasive WEb Content Delivery with Efficient Data Reuse Internet Aug. 1, 2002 retrieved from url:http//2002.iwcw.org/papers/18500120.pdf retrieved on Aug. 16, 2004.

"The Multitasking Mindset Meets the Operating System" EDN Electrical Design News Cahners Publishing Co. Newton Massachusetts vol. 35 no. 20 Oct. 1, 1990.

Digital 5, "Media Server," printed Apr. 18, 2005, 2 pages.

DRM Watch Staff, "Microsoft Extends Windows Media DRM to Non-Windows Devices," DRM Watch, May 7, 2004, 2 pages.

Huang, et al., "A Frame-Based MPEG Characteristics Extraction Tool and Its Application in Video Transcoding"; IEEE Transaction on Consumer Electronics, Aug. 2002; vol. 48, No. 3; pp. 522-532.

Ihde, Steven C. et al., "Intermediary-based Transcoding Framework," printed Apr. 18, 2005, pp. 1-3.

Kassler et al., "Generic QOS Aware Media Stream Transcoding and Adaptation," Dept. of Distributed Systems, University of Ulm, Germany, printed Apr. 19, 2005, 10 pages.

Lee, Yui-Wah et al., "Gamma: A Content-Adaptation Server for Wireless Multimedia Applications," Bell Laboratories, Holmdel, NJ USA, printed Apr. 18, 2005, pp. 1-36.

Lee, et al., "Data Synchronization Protocol in Mobile Computing Environment Using SyncML"; HSNMC 2002 5th IEEE International Conference on High Speed Networks and Multimedia Communications, 2002; pp. 133-137.

LightSurf Technologies, "LightSurf Intelligent Media Optimization and Transcoding," printed Apr. 18, 2005, 1 page.

Nikkei Electronics, "Contents Transcoding Technology is Now Spotlighted as 'Lubricant' for Online Digital Distribution"; vol. 775, 2000, pp. 57-62.

"Multimedia Content Adaptation for QoS Management over Heterogeneous Networks" Internet May 11, 2001 retrieved Aug. 18, 2004.

"Caching Strategies in Transcoding-enabled Proxy Systems for Streaming Media Distribution Networks" Internet Dec. 10, 2003 Retrieved from URL:http://www.hpl.hp.com/techreports/2003/HPL-2003-261.pdf retrieved on Aug. 19, 2004.

Singh, "PTC: Proxies that Transcode and Cache in Heterogeneous Web Client Environments"; Proceedings of the Third International Conference on Web Information Systems, 2002; pp. 11-20.

"Context -based media Adaptation in Pervasive Computing" Internet May 31, 2001 Retrieved from url:http://www.mcrlab.uottawa.ca/papers/Ryan_paper.pdf retrieved on Aug. 19, 2004.

* cited by examiner

SANCTIONED TRANSCODING OF DIGITAL-MEDIA CONTENT

TECHNICAL FIELD

This invention generally relates to a digital media technology performing actions (e.g., transcoding) on or with digital media content having a defined format.

BACKGROUND

As digital media technology continues to advance, and the cost of storage continues to decline, users increasingly host and consume digital media content on their own primary computers (e.g., desktop PCs). Examples of such digital media include music, video, still images, and so on. So, this means that increasingly users are listening to digital music, watching digital video, and viewing still images (e.g., photographs) on their home or business computers.

At the same time, the corresponding increase in the availability of portable media-playback devices such as personal digital assistants (PDAs), digital media players (e.g., so-called "MP3 players"), hand-held computers, laptop computers, and smart phones is providing users more ubiquitous access to digital media content than ever. As users rely more and more on such portable computing devices, there is a growing need for applications that effectively transfer digital media from source devices, such as primary computers, to the portable devices.

However, the existence of the multitude of media content formats complicates the transference of digital media content from source devices to target media-playback devices. This multitude of media content formats raises issues about format compatibility with target media-playback devices and management of legal rights for transferred media content.

Digital media content typically exists in a specified "format." Herein, a "format" of digital media content includes its specific pre-established arrangement or organization of media data in computer-readable storage media. In addition, media data is typically compressed (and later decompressed) using a specific compression/decompression ("codec") algorithm. Because a media format and its specified codec are often closely associated, the line between them is often blurred. Herein, unless the context indicates otherwise, references to the "format" of digital media content includes the codec associated with compressing/decompressing the content, as well as the content's specific pre-established arrangement or organization of media data in computer-readable storage media.

There is a variety of conventional and available formats of digital media content. Some formats are generally available with low or no commercial encumbrances (e.g., paying of royalty fees). Examples of these widely available formats include WAV, MPEG audio layer 3 (commonly called "MP3"), and AVI. Others formats are proprietary; therefore, the uses of these formats often are controlled by licensing agreements. Examples of these proprietary formats include the Adaptive Transform Acoustic Coding (Atrac®) format from the Sony Corporation; the RealAudio™ format from RealNetworks, Inc., the QuickTime™ format from Apple Computers, Inc. and Windows Media Audio (WMA) and the Windows Media Video (WMV) formats from the Microsoft Corporation.

Typically, a media-playback device is designed to handle one or more specific formats of the digital media content ("formatted-media-content"). Due to space, processing-power, memory, and licensing constraints, these playback devices typically have a limited set of compatible formats. Often, a device manufacturer licenses the technology for playing formatted-media-content in a proprietary format, such as those formats listed above. Sometimes, the device manufacturer implements its own proprietary format technology.

Since a target playback device typically employs a different or slightly altered format than does the source device (e.g., desktop PC), the format of formatted-media-content is typically altered before being transferred from the source device to the target device. This format-alteration is commonly called "transcoding."

A transcoding process may include, for example, converting a formatted-media-content from one format to another (e.g., MP3 to WMA), so the newly formatted content will play on the playback device. Furthermore, a transcoding process may include, for example, down-sampling the formatted-media-content to a lower bit rate to reduce the amount of storage space needed on the playback device, or adapting the screen size of the formatted-media-content, so video appears correctly on the playback device.

When transcoding, the formatted-media-content is sometimes converted into a format having lower processing requirements for decoding. A formatted-media-content configured for playback on a full-scale "desktop" computer may be too complex to decode effectively on a device with a lower-powered processor, such as a portable media-playback device. Furthermore, when transcoding, the formatted-media-content is sometimes converted into a specific format (e.g., a proprietary format) employed by the target media-playback device.

There are many different conventional approaches employed when transferring formatted-media-content from a source device to a target media-playback device. Many of those conventional approaches include transcoding the formatted-media-content into a format compatible with, and/or preferred by, the target device ("compatible/preferred format").

SUMMARY

Described herein are one or more implementations for transferring formatted digital media content ("formatted-media-content") from a source device (e.g., a desktop computer) to a target media-playback device (e.g., a MP3 player). The formatted-media-content may need to be converted from a source format to a target format before it is transferred. An implementation seeks permission from a source-format-agent associated with the source format of the formatted-media-content to perform a format-conversion ("transcoding").

BRIEF DESCRIPTION OF THE DRAWINGS

The same numbers are used throughout the drawings to reference like elements and features.

DETAILED DESCRIPTION

One or more implementations, described herein, transfer formatted digital media content ("formatted-media-content") from a source device (e.g., a desktop computer) to a target media-playback device (e.g., a MP3 player). However, the transfer occurs after determining the target-format of the digital media content and converting (i.e., "transcoding") the content from its source format to its target format. Furthermore, an implementation seeks permission, from a source-format-agent associated with the source format of the formatted-media-content, to perform a format-conversion ("transcoding"). With permission granted, an implementation performs a sanctioned transcoding of the formatted-media-content from its source format into the target format.

The one or more implementations, described herein, offer an open and secure source-format-protection mechanism, which is open to all owners of source-formats of digital media content who are willing to participate. With this new open and secure mechanism, a media-playback application may request of the owner of a particular source format (which is represented by a source-format-agent) that the application be allowed to perform some action (such as transcoding) on or to the media content that is contained in that particular source format.

The media-playback application has no intimate knowledge of the particular source format. The media-playback application asks one or more of the source-format-agents involved in decoding the content whether a specific action (e.g., transcoding) is permissible. The source-format-agents respond yea or nay. In doing so, the media-playback application does not know or need to know any details about the source format of the formatted-media-content.

Exemplary Environment for Sanctioned Transcoding

Figure 1:
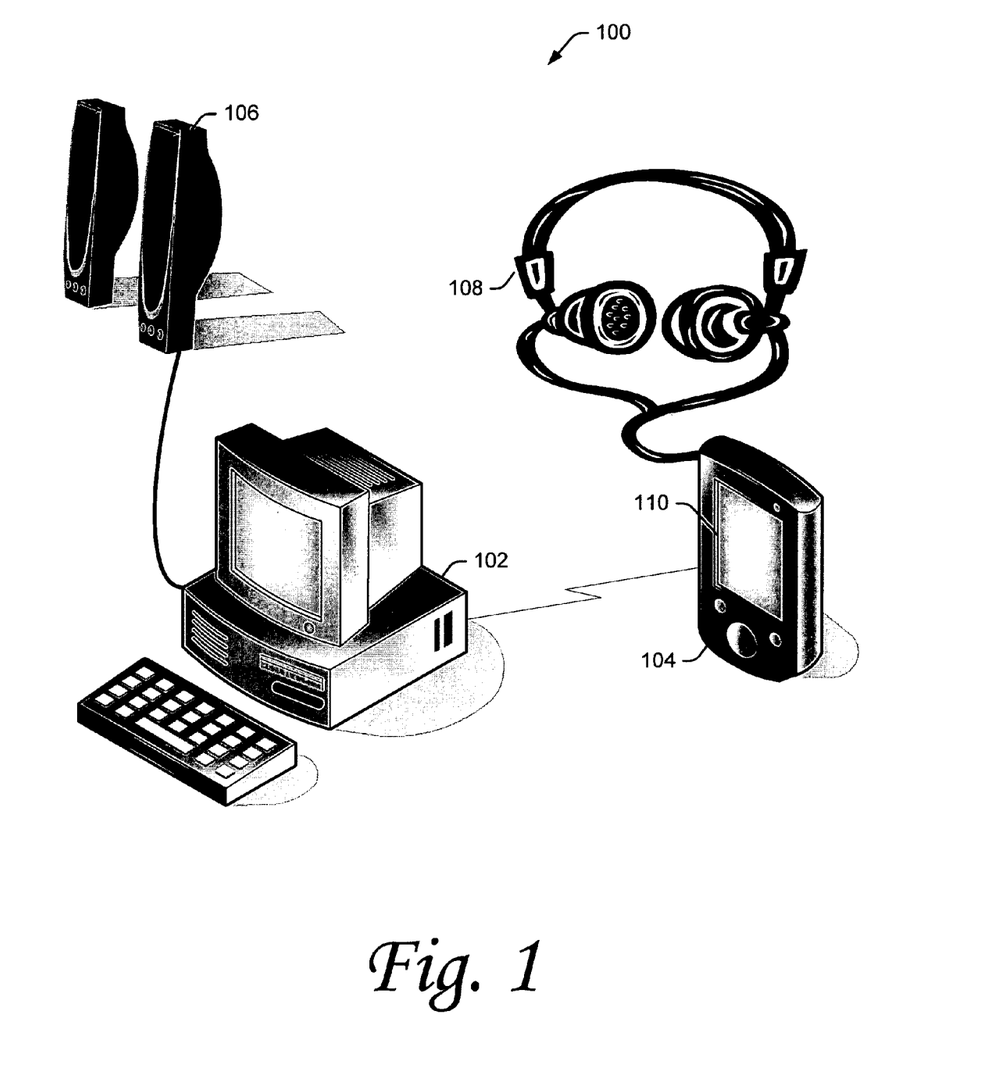
FIG. 1 illustrates an exemplary environment in accordance with one or more implementations described herein.

FIG. 1 illustrates an exemplary environment 100 suitable for one or more implementations described herein. As depicted, FIG. 1 illustrates a source computing device 102 in anticipation of transferring (also called "synchronization") digital media content to a subsequently coupled target media-playback device 104. In this example, the devices are coupled via a physical wired connection. Other implementations may employ other mechanisms for operatively coupling the devices (e.g., wireless)

The source computing device 102 typically has speakers 106 or headphones for rendering the audio portions of its digital media content. The target media-playback device 104 typically has headphone 108 or speakers for rendering the audio portions of the transferred digital media content. The target device 104 may also have a display screen 110 for rendering still and/or motion images of the transferred digital media content.

Figure 4:
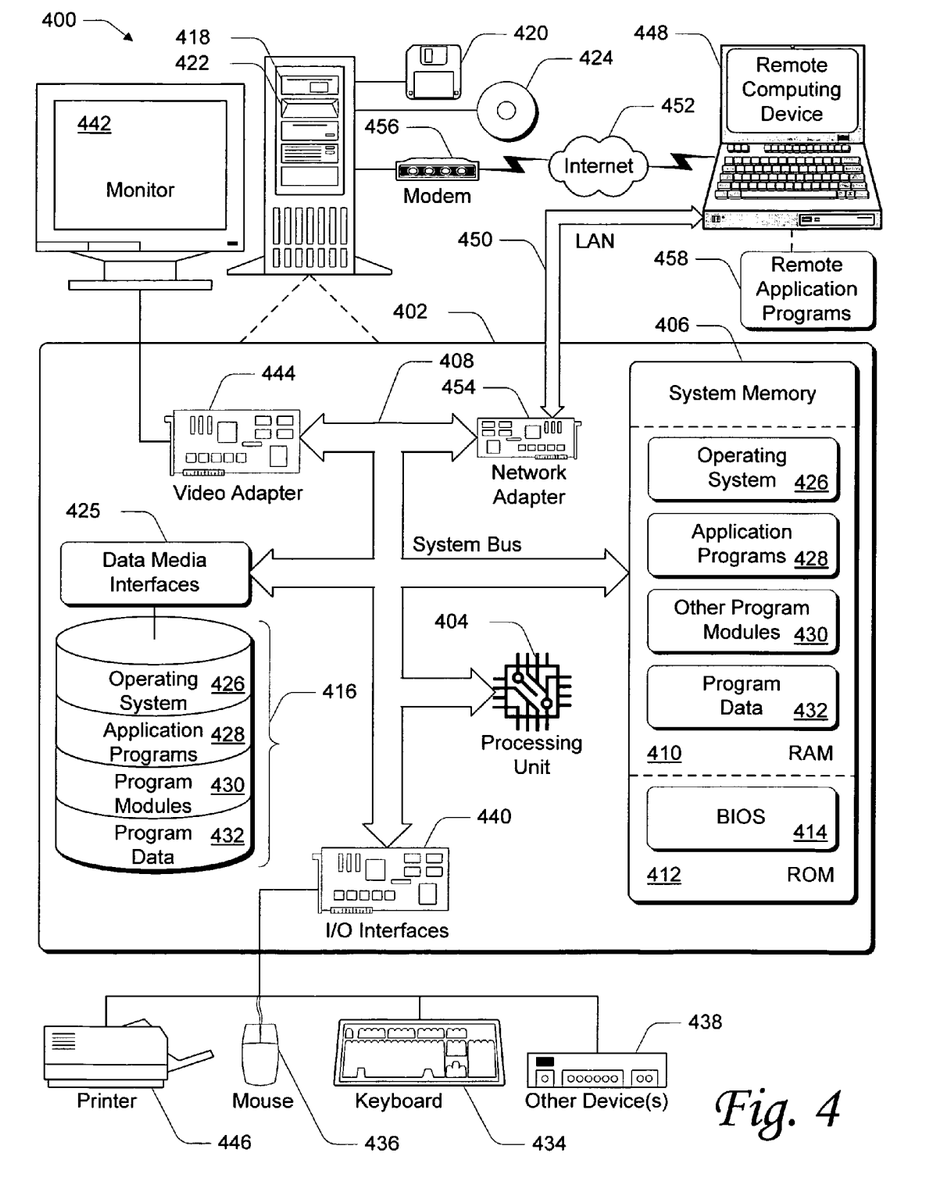
FIG. 4 is an example of a computing operating environment capable of (wholly or partially) implementing at least one embodiment described herein.

The source computing device 102 is typically implemented as a user's primary computing device, such as a desktop personal computer (PC). Source device 102 might also be implemented as other conventional computing devices generally configured to receive and render multi-media content from various sources, and/or to reformat such content for synchronization and playback on a target playback device 104. An example of a source-computing device 102 is depicted in FIG. 4 and described in detail below in the Exemplary Computing Environment section.

Target media-playback device 104 may be implemented as any one of numerous digital media player devices available from various manufacturers. Such devices are, for example, configured to store and play back audio data in the form of variously formatted music files, such as MP3 (MPEG-1 Audio Layer 3) files and WMA (Windows Media Audio) files. Some playback devices are also configured to store and play back video data in the form of variously formatted video files, such as MPEG-4 files and WMV (Windows Media video) files. Therefore, examples of the target media-playback device 104 may include various general-purpose laptop and notebook computers configured to playback media content, in addition to devices that are more specifically designed to play back various forms of multimedia, such as the RIO™ Riot and RIO™ KARMA™; ARCHOS™ Jukebox Recorder and Pocket Audio/Video Recorder; CREATIVE™ Jukebox ZEN™ and Portable Media Center ZEN™; APPLE™ iPod™, and so on.

Exemplary Embodiments for Sanctioned Transcoding

Figure 2:
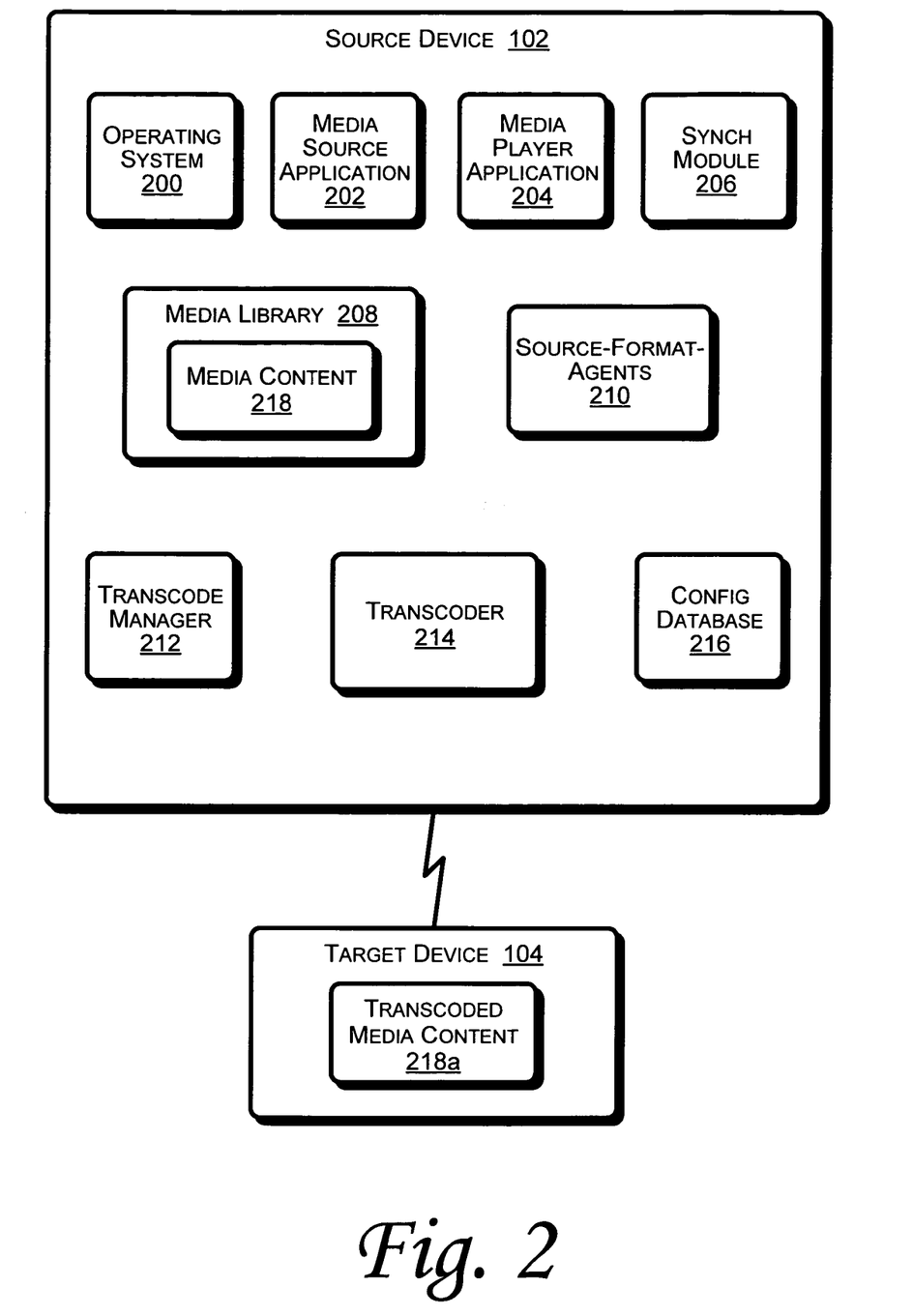
FIG. 2 illustrates a block diagram representation of an exemplary source device in accordance with one or more implementations described herein.

FIG. 2 illustrates a block diagram representation of the exemplary source device 102 that is suitable for one or more implementations described herein. Various components on the source device 102 facilitate the retrieval and management of digital media content for the general purpose of rendering the content on source device 102 and/or synchronizing the content with the target playback device 104.

These components include an operating system 200, one or more media-source applications 202, a media-player application 204, a media-content synchronization program module 206, a media library 208, one or more source-format-agents 210, a transcode manager 212, a transcoder 214, and a configuration database 216. These components are embodied on one or more processor-readable media, such as a primary memory of a computer. Although these components are illustrated separately on the source device 102, it is noted that any one or more of these components may be implemented on the source device 102 as part of an integrated product. For example, one or more of these components may be implemented as part of a multimedia software product, the operating system 200, or as stand-alone components.

The media-source application 202 may be one or more of various applications and/or tools configured to receive, retrieve, and/or access media content. For example, the media-source application 202 may be a digital audio application that facilitates the downloading of digital audio via, for example, the Internet. The media-source application 202 may be an interactive TV service application that facilitates the recording of video (e.g., TV programming) directly from a cable and/or satellite feed, a video capture component to transfer home video footage from a digital video recorder onto source device 102, a Web browser application that facilitates downloading media from the Internet, and so on. Such media-source applications 202 typically supply various forms of media content 218 to a media library 208 on source device 102. Thus, media content 218, stored in the media library 208, may include, for example, audio files in the form of MP3 and WMA files, video files in the form of DVR-MS, AVI and MOV files, and image files in the form of GIF and JPEG files.

The media-player application 204 is typically a desktop-based application player that manages a broad range of multimedia related tasks. A media-source application 202 may also include, or be part of, a media-player application 204. The media-player application 204 may handle, for example, streaming audio and video, CD/DVD playback, MP3 and WMA support, encoding, CD/DVD burning, Internet radio, and the like. A media-player application 204 may also offer Web browser integration, so it can be embedded in a browser, enabling multi-tasking during streaming video. Like other media-source applications 202, a media-player application 204 may supply various forms of media content 218 (e.g., audio files, video files, image files, etc.) to the media library 208 on source device 102.

The media-content synchronization program module 206 ("synch module") provides a user-configurable model for facilitating the transfer, from source device 102, of a subset of the digital media content 218 in the media library 208, to one or more target devices 104. The synch module 206 may be part of the media-player application 204, be part of the operating system 200, or be a stand-alone component. The synch module 206 works in coordination with one or more format-specific source-format-agents 210 to manage the digital rights of transferred media content.

In addition, the synch module 206 interrogates one or more target devices 104, connected to the source device 102. During this interrogation, the synch module 206 discovers which formats of digital media content each device supports and/or prefers. While a target device may support multiple formats, the focus herein will be on one specified "target format" per target device, for the sake of clarity of explanation. After an initial interrogation, the specified target format for each target device may be stored in a configuration database, such as database 216.

Furthermore, the synch module 206 determines the specific source format of the formatted-media-content that is selected for transference to the target device 104. This determination may be via an examination of the "to-be-transferred" formatted-media-content itself and/or consultation with configuration information associated with the content. Such configuration may be stored in the associated content or in a configuration database, such as database 216.

Moreover, the synch module 206 works in cooperation with the transcode manager 212 and transcoder 214 to transcode digital media content, if necessary or desirable. After transcoding, the synch module 206 transfers transcoded media content 218a, from the source device 102, to the connected target playback device 104.

The media library 208 contains digital media content 218, such as audio, video, text, or image files. The media content 218 may also include a static or automated playlist of files (e.g., audio, video, and images) or any grouping of files or data. The synch module 206 may assign a transfer priority to media content 218, in the media library 208, to indicate their relative importance or desirability to the user.

Each source-format-agent 210 is associated with one or more specific defined formats and is charged with managing the formatted-media-content contained in its defined specific formats. In a sense, each source-format-agent 210 may be viewed as a representative of the "owner" of its associated formats. A source-format-agent 210 typically is not part of, or supplied with, the media-player application 204 or the synch module 206, but it works in cooperation with them.

A source-format-agent 210 typically is a program module such as a driver, application program interface (API), a DirectShow™ filter, and the like. The source-format-agent 210 may be a component of a "filtergraph." A source-format-agent 210 may consist of, for example, a filter having a source instance, instances of an audio decoder and an audio encoder, and instances of a video decoder and a video encoder. For example, RealNetworks may supply a filter program module (to run on the source device 102) for managing formatted-media-content contained in its defined format, RealAudio™.

Herein, the source-format-agent 210 may perform many management functions, such as compression/decompression and/or encryption/decryption of its associated source-formatted media-content, so that the content may be subsequently "played" or "transcoded." Furthermore, the management functions performed by a source-format-agent 210 may include sanctioning (e.g., authorizing) particular actions with its associated source-formatted media-content. Such actions include, for example, the following actions being performed on its associated source-formatted media-content:

play it;
 copy it;
 transcode or convert it;
 transfer it to a portable playback device;
 "burn" it to a compact-disc (CD) or other computer-readable media.

The transcode manager 212 facilitates transcoding of media content 218 for one or more target devices 104. In doing this, the transcode manager 212 interacts with the synch module 206, the transcoder 214, and possibly other components of source device 102. The transcode manager 212 acquires various information, such as:

source properties (e.g., source format) of the to-be-transferred formatted-media-content, as it is stored in the media library 208 on the source device 102;
 destination properties of the target device 104; for example, the specified target format for the target device;
 transcoding details.

The transcode manager 212 may, for example, acquire this information from the synch module 206 (which has interrogated the target device and to-be-transferred formatted-media-content). Alternatively, the transcode manager 212 itself may acquire the information from its original sources and/or from configuration databases, such as database 216. Alternatively still, the transcode manager 212 may determine or calculate the information from other sources and other information.

The transcoder 214 performs transcoding of the to-be-transferred formatted-media-content, under the direction of the transcode manager 212. The process of transcoding formatted-media-content (e.g., "media files") is well-known and may include (depending on device capabilities), for example, converting a media file from one format to another (e.g., MP3 to WMA), so the file will play on the target playback device 104, down-sampling a media file to a lower bit rate for compatibility with the target device and to reduce the amount of storage space needed on the target device, and adapting the screen size of a video file so the video plays back correctly on the target playback device. Transcoding is often used to convert a media file to a format having lower CPU requirements for decoding, since "desktop" content may be too complex to decode effectively on a device with a lower-powered processor, such as a portable media playback device. Transcoding can also include various other processes for altering media files, and those mentioned herein are included by way of example only, and not by way of limitation. Thus, other examples of transcoding include altering the word length of individual data samples (e.g. 24 bit to 16 bit), independently of the actual bit rate, altering the complexity profile of the encoder portion of the transcoding process to a more complex or more simple resultant file for purposes of managing CPU requirements at the destination device, and changing representative color spaces between the source and destination files as required by the target device (e.g. YUV to RGB, or vice versa).

The configuration database 216 is a data structure of configuration information. Such information may include identification of the specified target format for particular target devices. It may include an indication of which formats are associated with particular source-format-agents 210. The configuration database 216 may be composed of one or more files. It may be an application-specific database. Alternatively, it may be a centralized database of configuration information (e.g., the so-called "registry").

One or more implementations discussed herein involve transferring to-be-transferred formatted-media-content to the target device 104, which is, for example, a portable multimedia playback device. In other implementations, a target "device" may be a location on a computer-readable medium (e.g., a file on disk or a RAM location). One may do this to archive media content, for example.

In these implementations, interrogation of the target device may be accomplished by reading configuration data or obtained manually via a user-interface.

Methodological Implementation

Figure 3:
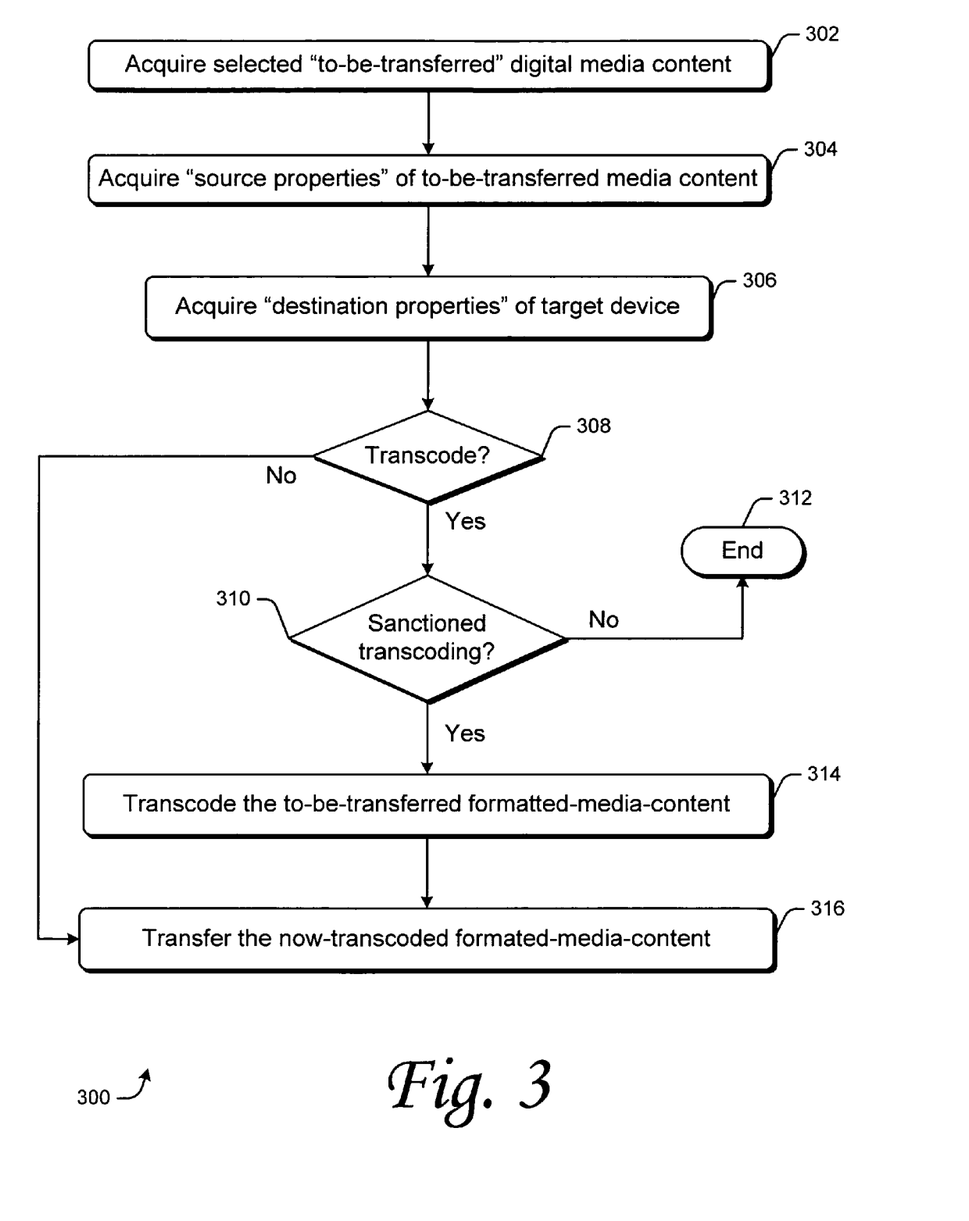
FIG. 3 illustrates a flow diagram showing a methodological implementation described herein.

FIG. 3 shows method 300 for transferring formatted-media-content with sanctioned transcoding. This method 300 is performed by one or more of the various components as depicted in FIG. 2. Furthermore, this method 300 may be performed in software, hardware, or a combination thereof. For ease of understanding, this method is delineated as separate steps represented as independent blocks in FIG. 3; however, these separately delineated steps should not be construed as necessarily order dependent in their performance. Additionally, for discussion purposes, the method 300 is described with reference to FIG. 2. Also for discussion purposes, particular components are indicated as performing particular functions; however, other components (or combinations of components) may perform the particular functions.

At 302 of FIG. 3, synch module 206 acquires a particular media file. This may be a manifestation of digital media content that a user has selected or that has been automatically selected for transfer to a target device 104. Consequently, this selected media content is described, herein, as "to-be-transferred." This may be initiated by the manual actions of a user (e.g., selecting media files for transfer to a target device) or automatically by programmed actions.

At 304, the synch module 206 acquires the "source properties" of the "to-be-transferred" media content. Such properties include, for example, the specific defined format (e.g., WMA or MP3) of the media content. Consequently, this selected media content is described, herein, as the "to-be-transferred formatted-media-content." The synch module may acquire this information via interrogation, database look-up, detection, and/or determination.

At 306, the synch module 206 acquires the "destination properties" of the target device 104. Those properties include the specified target format (e.g., WMA or MP3) for the media content. The synch module may acquire these destination properties from target device itself (via an interrogation), from configuration data, and/or via a user-interface. In one or more implementations, a target "device" may be the target device 104 and/or a location on a computer-readable medium (e.g., a file on disk or a RAM location).

At 308, the transcode manager 212 determines whether to transcode the to-be-transferred formatted-media-content. If the source format (which is the format of the to-be-transferred formatted-media-content) and the target-specified-format match, then typically no transcoding is necessary. Note that sometimes transcoding is desirable even when the source format and the target-specified-format nominally match. For example, the source format may be MP3 and the specified-target-format may be MP3. While this is a nominal match, it may be desirable to transcode because of other desirable alternations such as those related to the capacity and capabilities of the target device 104.

Therefore, if it is determined that transcoding is not desirable, then the process skips to block 316 for transference. Otherwise, transcoding is necessary or desirable, and the method proceeds.

At 310, the transcode manager 212 interrogates the associated source-format-agent 210 to determine if it will sanction a transcoding of its associated source-formatted media-content. In other words, the transcode manager 212 asks the source-format-agent that "owns" the source format (which is the format of the to-be-transferred formatted-media-content) if it will grant permission for the to-be-transferred formatted-media-content to be converted into another format (namely, the target-specified-format).

As depicted in FIG. 3, this interrogation of the source-format-agents is shown occurring in temporal proximity (i.e., near in time) to the transcoding and transferring actions (of blocks 314 and 316). The source-format-agents may be interrogated a priori any actual occurrence of transcoding and transferring actions involving the agent's associated formats.

In one or more implementations, all existing agents are interrogated for all known target formats. In one or more implementations, all existing agents are interrogated upon the introduction of a possible new target format. In one or more implementations, each new agent is interrogated upon installation into a source device. In these a priori interrogation implementations, the agents' responses may be stored in a configuration database (such as database 216) and then, at 310, the transcode manager 212 performs a database lookup to determine if the associated source-format-agent 210 sanctions a transcoding of its associated source-formatted media-content.

When interrogating the associated source-format-agent 210, the transcode manager 212 may specifically interrogate all components of the source-format-agent. For example, the associated format-specific source-format-agent 210 may be a component of a filter graph having a source instance, instances of an audio decoder and an audio encoder, and instances of a video decoder and a video encoder. The transcode manager 212 may interrogate each instance. In one or more implementations, the manager may interpret any refusal from any single instance as a refusal to sanction the transcoding. In one or more implementations, the manager may interpret a lack of at least one positive answer as a refusal to sanction the transcoding.

If the associated source-format-agent 210 refuses to sanction the transcoding, then this method ends at 312. Otherwise, if the associated source-format-agent 210 sanctions the transcoding, then the method proceeds to 314.

At 314, the transcoder 214 transcodes the to-be-transferred formatted-media-content. Typically the transcoder utilizes the associated source-format-agent 210 to perform the format-specific decompressing/decrypting of the content. With the content now qualified, the transcoder converts the now-qualified media content into the target-specified-format of the target device 104.

At 316, the synch module 206 transfers the now-transcoded formatted-media-content to the target device 104. If the transcoding block at 314 has been skipped (because, for example, transcoding was deemed unnecessary at 308), then the transferred formatted-media-content will not have been transcoded.

The above discussion of this method 300 focuses on the associated format-specific source-format-agent 210 sanctioning the transcoding of specific formatted-media-content. However, alternative implementations may seek sanctioning of other actions from the associated source-format-agent 210. For example, permission may be sought from the sourceformat-agent to perform the following actions on or with its associated source-formatted media-content:
- play it;
- copy it;
- transfer it to a portable playback device;
- transcode or convert it;
- "burn" it to a compact-disc (CD) or other computer-readable media.

In another alternative implementation, the transcode manager 212 may also seek permission from, and/or get the cooperation of, a source-format-agent associated with the target-specified-format, when the target-specified-format is "owned" by a source-format-agent.

Exemplary Computing System and Environment

FIG. 4 illustrates an example of a suitable computing environment 400 within which an exemplary formatted-media-content transfer manager, such as the components of the source device 102, as described herein, may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The exemplary formatted-media-content transfer manager may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary formatted-media-content transfer manager may be described in the general context of computer-executable instructions, such as program modules, being executed by a computer. Generally, program modules include routines, programs, objects, components, data structures, etc. that perform particular tasks or implement particular abstract data types. The exemplary formatted-media-content transfer manager may also be practiced in distributed computing environments where tasks are performed by remote processing devices that are linked through a data-communications network. In a distributed computing environment, program modules may be located in both local and remote computer storage media, including memory storage devices.

The computing environment 400 includes a general-purpose computing device in the form of a computer 402. The components of computer 402 may include, but are not limited to, one or more processors or processing units 404, a system memory 406, and a system bus 408 that couples various system components, including the processor 404, to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 402 typically includes a variety of computer-readable media. Such media may be any available media that is accessible by computer 402 and includes both volatile and non-volatile media, removable and non-removable media.

The system memory 406 includes computer-readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 may be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electronically erasable programmable read-only memory (EEPROM), and the like, may also be utilized to implement the exemplary computing system and environment.

Any number of program modules may be stored on the hard disk 416, magnetic disk 420, optical disk 424, ROM 412, and/or RAM 410, including, by way of example, an operating system 426, one or more application programs 428, other program modules 430, and program data 432.

A user may enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device may also be connected to the system bus 408 via an interface, such as a video adapter 444. In addition to the monitor 442, other output peripheral devices may include components, such as speakers (not shown) and a printer 446, which may be connected to computer 402 via the input/output interfaces 440.

Computer 402 may operate in a networked environment, using logical connections to one or more remote computers, such as a remote computing device 448. By way of example, the remote computing device 448 may be a personal computer, a portable computer, a server, a router, a network computer, a peer device or other common network node, and the like. The remote computing device 448 is illustrated as a portable computer that may include many or all of the elements and features described herein, relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. Such networking environments may be wired or wireless.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which may be internal or external to computer 402, may be connected to the system bus 408 via the input/output interfaces 440 or other appropriate mechanisms. It is to be appreciated that the illustrated network connections are exemplary and that other means of establishing communication link(s) between the computers 402 and 448 may be employed.

In a networked environment, such as that illustrated with computing environment 400, program modules depicted, relative to the computer 402 or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computing device 402, and are executed by the data processor(s) of the computer.

Computer-Executable Instructions

An implementation of an exemplary formatted-media-content transfer manager may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 4 illustrates an example of a suitable operating environment 400 in which an exemplary formatted-media-content transfer manager may be implemented. Specifically, the exemplary formatted-media-content transfer manager(s) described herein may be implemented (wholly or in part) by any program modules 428-430 and/or operating system 426 in FIG. 4, or a portion thereof.

The operating environment is only an example of a suitable operating environment and is not intended to suggest any limitation as to the scope or use of functionality of the exemplary formatted-media-content transfer manager(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Computer-Readable Media

An implementation of an exemplary formatted-media-content transfer manager may be stored on or transmitted across some form of computer-readable media. Computer-readable media may be any available media that may be accessed by a computer. By way of example, computer-readable media may comprise, but is not limited to, "computer storage media" and "communications media."

"Computer storage media" include volatile and non-volatile, removable and non-removable media, implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, data structures, program modules, or other data in a modulated data signal, such as carrier wave or other transport mechanism. Communication media also includes any information delivery media.

CONCLUSION

The techniques, described herein, may be implemented in many ways, including (but not limited to) program modules, general- and special-purpose computing systems, network servers and equipment, dedicated electronics and hardware, and as part of one or more computer networks. The techniques may, for example, be implemented on a computer system depicted in FIG. 4.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. In a source device configured to couple to a target media-playback device, a method comprising the acts of:
    selecting digital media content intended for transfer from a source device to a coupled target media-playback device, wherein the selected to-be-transferred media content has a defined format, which is associated with a source-format-agent;
    assigning a transfer priority to the selected to-be-transferred media content to indicate a relative desirability of the selected to-be-transferred media content;
    determining a target format of the selected to-be-transferred media content specified by the coupled target media-playback device, wherein the target format is a format of the selected to-be-transferred media content that is playable on the coupled target media-playback device;

determining whether the source-format-agent sanctions transcoding the selected to-be-transferred media content, wherein a lack of at least one positive answer from the source-format-agent is interpreted as a refusal to sanction the transcoding;

if transcoding is sanctioned, transcoding the selected to-be-transferred media content into the target format by converting the selected to-be-transferred media content from the defined format to the target format and sampling the selected to-be-transferred media content to a different bit rate for compatibility with the coupled target media-playback device;

if transcoding is sanctioned, transferring the transcoded media content to the coupled target media-playback device.

2. A method as recited in claim 1, wherein, if transcoding is not sanctioned, then not performing the transcoding and transferring acts.

3. A method as recited in claim 1, further comprising determining the defined format of selected to-be-transferred media content.

4. A method as recited in claim 1, wherein the selecting act is carried out, at least in part, by user selection of digital media content stored on the source device.

5. A method as recited in claim 1, wherein the act of determining a target format is carried out by examining one or more stored files of configuration data.

6. A method as recited in claim 1, wherein the act of determining whether the source-format-agent sanctions transcoding is carried out by interrogating the source-format-agent.

7. A method as recited in claim 1, wherein the act of determining whether the source-format-agent sanctions transcoding is carried out by examining one or more stored files of configuration data.

8. A method as recited in claim 1, wherein the defined format and the target format are different formats, each format defines a specific pre-established arrangement or organization of digital media data for storage on computer-readable storage media and each format has one or more codecs associated therewith for compressing, decompressing, or both the digital media data arranged in that format.

9. In a source device configured to couple to a target media-playback device, a method comprising the acts of:

selecting digital media content intended for transfer from a source device to a coupled target media-playback device, wherein the selected to-be-transferred media content has a defined format, which is associated with a source-format-agent;

determining a target format specified by the coupled target media-playback device, wherein the target format is a format of the selected to-be-transferred media content that is playable on the coupled target media-playback device;

determining whether to transcode the selected to-be-transferred media content into the target format, wherein transcoding the selected to-be-transferred media content into the target format comprises at least: converting the selected to-be-transferred media content from the defined format to the target format and sampling the selected to-be-transferred media content to a different bit rate for compatibility with the coupled target media-playback device;

in response to a determination to not transcode, transferring the selected to-be-transferred media content to the coupled target media-playback device.

10. A method as recited in claim 9, wherein the act of determining whether to transcode is based, at least in part, upon whether the target format matches the defined format of the selected to-be-transferred media content.

11. A method as recited in claim 9, wherein the digital media content is selected from a group consisting of digital audio, digital still images, and digital video.

12. A method as recited in claim 9 wherein the selected to-be-transferred media content is associated with a source-format-agent and in response to a determination to transcode, then the method further comprises that acts of:

interrogating the source-format-agent to determine if the source-format-agent will sanction transcoding the selected to-be-transferred media content;

if transcoding is sanctioned, transcoding the selected to-be-transferred media content into a target format, specified by the coupled target media-playback device;

if transcoding is sanctioned, transferring the transcoded media content to the coupled target media-playback device.

13. A method as recited in claim 12, further comprising determining the defined format of selected to-be-transferred media content.

14. A method as recited in claim 12, wherein the selecting act is carried out, at least in part, by user selection of digital media content stored on the source device.

15. A method as recited in claim 12, wherein the interrogating act is carried out by interrogating the source-format-agent and storing the response in one or more stored files of configuration data.

16. A method as recited in claim 12, wherein the interrogating act is carried out by examining one or more stored files of configuration data.

17. A method comprising the acts of:

selecting digital media content of a source device, wherein the selected media content has a defined format, which is associated with a source-format-agent, the defined format being a specific pre-established arrangement or organization of digital media data for storage on computer-readable storage media and the defined format having one or more codecs associated therewith for compressing, decompressing, or both the digital media data arranged in that format;

interrogating the source-format-agent to determine if the source-format-agent will sanction a format-specific action to be performed with the selected media content to transcode the selected media content into a target format by converting the selected media content from the defined format to the target format and down-sampling the selected media content to a lower bit rate for compatibility with a target media-playback device, wherein the target format is a format of the selected media content that is playable on the target media-playback device;

if the source-format-agent sanctions the action, then performing the sanctioned action with the selected media content.

18. A method as recited in claim 17, wherein a format-specific action is selected from a group consisting of playing the selected media content, copying the selected media content, transcoding the selected media content, transferring the selected media content from a source device to the target media-playback device, and burning removable computer-readable media with the selected media content.

19. A method as recited in claim 17, wherein a format-specific action comprises at least one of the following: playing the selected media content, copying the selected media content, transcoding the selected media content, transferring the selected media content from a source device to the target media-playback device, or burning removable computer-readable media with the selected media content.

20. A method for sanctioned transcoding of digital-media content between a source device and a coupled target media playback device, the method comprising:
   selecting digital media content intended for transfer from a source device to a coupled target media-playback device, wherein the selected to-be-transferred media content has a defined format which is associated with a source-format-agent;
   determining the defined format of selected to-be-transferred media content;
   determining a target format of media content specified by the coupled target media-playback device, wherein the determining the target format includes examining one or more stored files of configuration data, and the target format is a format of the selected to-be-transferred media content that is playable on the target media-playback device;
   determining whether the source-format-agent sanctions transcoding the selected to-be-transferred media content by:
   interrogating the source-format agent;
   examining the one or more stored files of configuration data; and
   determining whether the target format matches the defined format of the selected to-be-transferred media content;
   wherein if transcoding is sanctioned:
   transcode the selected to-be-transferred media content into the target format by converting the selected to-be-transferred media content from the defined format to the target format and down-sampling the selected media content to a lower bit rate for compatibility with the coupled target media-playback device; and
   transfer the transcoded media content to the coupled target media-playback device; and
   wherein if transcoding is not sanctioned:
   transferring the selected to-be-transferred media content to the coupled target media-playback device if the target format matches the defined format; or
   not performing the transcoding and transferring acts,
   wherein the defined format and the target format are different formats, each format defines a specific pre-established arrangement or organization of digital media data for storage on computer-readable storage media and each format has one or more codecs associated therewith for compressing, decompressing, or both the digital media data arranged in that format.

* * * * *